United States Patent
Lee et al.

(10) Patent No.: US 12,165,397 B2
(45) Date of Patent: Dec. 10, 2024

(54) METHOD AND DEVICE FOR HIGH-SPEED IMAGE RECOGNITION USING 3D CNN

(71) Applicant: POSTECH RESEARCH AND BUSINESS DEVELOPMENT FOUNDATION, Pohang-si (KR)

(72) Inventors: Young Joo Lee, Pohang-si (KR); Young Seok Kim, Seongnam-si (KR); Gun Ho Park, Busan (KR); Hyun Hoon Lee, Yeongcheon-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 613 days.

(21) Appl. No.: 17/422,161

(22) PCT Filed: Jan. 14, 2020

(86) PCT No.: PCT/KR2020/000647
§ 371 (c)(1),
(2) Date: Jul. 9, 2021

(87) PCT Pub. No.: WO2020/149601
PCT Pub. Date: Jul. 23, 2020

(65) Prior Publication Data
US 2022/0108545 A1   Apr. 7, 2022

(30) Foreign Application Priority Data
Jan. 15, 2019 (KR) .................. 10-2019-0005188
Jan. 15, 2019 (KR) .................. 10-2019-0005200

(51) Int. Cl.
*G06V 10/82*   (2022.01)
*G06N 3/04*    (2023.01)
(Continued)

(52) U.S. Cl.
CPC ............... *G06V 10/82* (2022.01); *G06N 3/04* (2013.01); *G06N 3/0455* (2023.01);
(Continued)

(58) Field of Classification Search
CPC .......... G06V 10/82; G06N 3/04; G06N 3/045; G06N 3/0464; G06N 3/0475; G06N 3/0495; G06N 3/0499; G06N 3/0455
See application file for complete search history.

(56) References Cited

U.S. PATENT DOCUMENTS 9,836,853 B1 *   12/2017   Médioni ................ G06V 20/40
2018/0032846 A1*   2/2018   Yang ..................... G06V 10/811
(Continued)

FOREIGN PATENT DOCUMENTS

JP      2017538999 A      12/2017
KR   10-2016-0083900 A     7/2016
(Continued)

OTHER PUBLICATIONS

E. Park et al., "Big/little deep neural network for ultra low power inference," 2015 International Conference on Hardware/Software Codesign and System Synthesis (CODES+ISSS), Amsterdam, Netherlands, 2015, pp. 124-132, doi: 10.1109/CODESISSS.2015. 7331375. https://ieeexplore.ieee.org/document/7331375 (Year: 2015).*

(Continued)

*Primary Examiner* — Matthew C Bella
*Assistant Examiner* — Andrew B. Jones
(74) *Attorney, Agent, or Firm* — Morgan, Lewis & Bockius LLP

(57) ABSTRACT

The present disclosure provides is a high-speed image recognition method and apparatus using a 3D CNN. The high-speed image recognition method using the 3D CNN includes: inputting each of a first image clips among image clips constituting an input image to the 3D CNN; acquiring (Continued)

softmax function values calculated in the 3D CNN with respect to each of the first image clips; calculating a score margin by using the softmax function values; comparing the score margin with a predetermined threshold value to determine whether to input at least one additional image clip other than the first image clips among the image clips constituting the input image to the 3D CNN. Therefore, a calculation speed for image recognition can be improved.

20 Claims, 6 Drawing Sheets

(51) Int. Cl.
    *G06N 3/0455* (2023.01)
    *G06N 3/0475* (2023.01)
    *G06N 3/0495* (2023.01)
    *G06N 3/0499* (2023.01)

(52) U.S. Cl.
    CPC ......... *G06N 3/0475* (2023.01); *G06N 3/0495* (2023.01); *G06N 3/0499* (2023.01)

(56) References Cited

U.S. PATENT DOCUMENTS

| | | |
|---|---|---|
| 2018/0232947 A1 | 8/2018 | Nehmadi et al. |
| 2018/0260997 A1 | 9/2018 | Petkov et al. |
| 2019/0179960 A1* | 6/2019 | Im .......................... G06V 20/40 |

FOREIGN PATENT DOCUMENTS

| | | |
|---|---|---|
| KR | 10-2017-0000748 A | 1/2017 |
| WO | 2015/066628 A1 | 11/2014 |
| WO | 2016095117 A1 | 12/2014 |

OTHER PUBLICATIONS

E. Park et al., "Big/little deep neural network for ultra low power inference," 2015 International Conference on Hardware/Software Codesign and System Synthesis (CODES+ISSS), Amsterdam, Netherlands, 2015, pp. 124-132, doi: 10.1109/CODESISSS.2015.7331375. (Year: 2015).*

* cited by examiner

METHOD AND DEVICE FOR HIGH-SPEED IMAGE RECOGNITION USING 3D CNN

CROSS-REFERENCE TO RELATED APPLICATIONS

The present application is a U.S. National Phase application under 35 U.S.C. § 371 of an International application No. PCT/KR2020/000647 filed on Jan. 14, 2020, which is based on and claims the benefit of convention priorities to Korean Patent Application No. 10-2019-0005188, filed on Jan. 15, 2019 and No. 10-2019-0005200, filed on Jan. 15, 2019 with the Korean Intellectual Property Office, the entirety of each of which is incorporated herein by reference for all purposes.

TECHNICAL FIELD

The present disclosure relates to a high-speed image recognition method and apparatus using three-dimensional (3D) convolutional neural network (CNN) and, more particularly, to a technique for increasing an operation speed by performing a network operation for an image recognition using the 3D CNN with respect to only some of input image clips while omitting some of the network operations with respect to subsequent image clips based on an operation result.

BACKGROUND

In light of recent advances in artificial intelligence technologies, deep learning which is a class of machine learning algorithms that train computers through high levels of abstraction to learn human thinking is actively being studied. The deep learning trains a training set using various artificial neural networks such as a deep neural network, a convolutional neural network (CNN), and a recurrent neural network (RNN) to perform inference operations for recognizing input data.

STATEMENT REGARDING FOREIGN RIGHTS

This invention was made with Korean government support awarded by Sports Promotion Fund of Seoul Olympic Sports Promotion Foundation supervised by Ministry of Culture, Sports and Tourism (MCST), Republic of Korea, and with further support under the Information Technology Research Center (ITRC) support program, IITP-2021-2020-0-01461, managed by Institute for Information & Communications Technology Planning & Evaluation (IITP) supervised by Ministry of Science and ICT (MSIT), Republic of Korea.

In particular, the convolutional neural network is attracting attention as it exhibits excellent performance in image classification, and involves one or more convolutional layers.

The image recognition using the convolutional neural network is typically used to identify an object included in an image or to recognize a behavior of the object or a person. However, a three-dimensional (3D) convolutional neural network which is used typically for recognizing the behavior of an object uses, as an input, a 3D image comprised of a plurality of two-dimensional (2D) images rather than a single 2D image.

A conventional 3D CNN requires lots of resources to handle a large amount of computations and variables due to the use of a deep network, and thus it is difficult to implement in small-sized devices such as Internet of things (IoT) devices having limited resources.

SUMMARY

To solve the above problems, provided is a high-speed image recognition method using three-dimensional (3D) convolutional neural network (CNN).

Also, provided is a high-speed image recognition apparatus using the 3D CNN.

According to an aspect of an exemplary embodiment, provided is a high-speed image recognition method using a 3D CNN.

The high-speed image recognition method using the 3D CNN includes: inputting each of a first image clips among image clips constituting an input image to the 3D CNN; acquiring softmax function values calculated in the 3D CNN with respect to each of the first image clips; calculating a score margin by using the softmax function values; comparing the score margin with a predetermined threshold value to determine whether to input at least one additional image clip other than the first image clips among the image clips constituting the input image to the 3D CNN.

The score margin may be a difference between a largest softmax function value and a second largest softmax function value among the softmax function values.

The operation of determining whether to input at least one additional image clip may include: determining whether to input remaining image clips other than the first image clips to the 3D CNN. The operation of determining whether to input the remaining image clips to the 3D CNN may include: when the score margin is greater than the threshold value, performing an image recognition for the input image only with the softmax function values for the first image clips without inputting an image clip subsequent to the first image clips to the 3D CNN; and when the score margin is smaller than the threshold value, inputting another image clip subsequent to the first image clips to the 3D CNN.

The operation of determining whether to input at least one additional image clip may include: determining whether to input a next image clip subsequent to the first image clips to a same network as the 3D CNN.

The operation of determining whether to input the next image clip subsequent to the first image clips to the same network as the 3D CNN may include: when the score margin is greater than the threshold value, inputting the next image clip subsequent to the first image clips to a network that is the same as the 3D CNN or shallower than the 3D CNN; and when the score margin is smaller than the threshold value, inputting the next image clip to a network deeper than the 3D CNN.

The operation of determining whether to input at least one additional image clip may include: comparing the score margin with a first threshold value to determine whether to input remaining image clips other than the first image clips to the 3D CNN; and comparing the score margin with a second threshold value to determine whether to input a next image clip subsequent to the first image clips to a same network as the 3D CNN.

The operation of acquiring the softmax function values may include: accumulatively storing the softmax function values in a memory.

The threshold value may be determined according to at least one of a type of a terminal performing an image recognition, a computing capability of the terminal, a type of the input image, a resolution of the input image, and a number of frames constituting the input image.

Each of the image clips constituting the input image may include a predetermined number of temporally consecutive frames among a plurality of frames constituting the input image.

According to another aspect of an exemplary embodiment, provided is a high-speed image recognition apparatus using a 3D CNN.

The high-speed image recognition apparatus includes: at least one processor; and a memory storing instructions executable by the at least one processor and, when executed by the at least one processor, causing the at least one processor to perform at least one operation.

The at least one operation includes: inputting each of a first image clips among image clips constituting an input image to the 3D CNN; acquiring softmax function values calculated in the 3D CNN with respect to each of the first image clips; calculating a score margin by using the softmax function values; comparing the score margin with a predetermined threshold value to determine whether to input at least one additional image clip other than the first image clips among the image clips constituting the input image to the 3D CNN.

The score margin may be a difference between a largest softmax function value and a second largest softmax function value among the softmax function values.

The operation of determining whether to input at least one additional image clip may include: determining whether to input remaining image clips other than the first image clips to the 3D CNN.

The operation of determining whether to input the remaining image clips to the 3D CNN may include: when the score margin is greater than the threshold value, performing an image recognition for the input image only with the softmax function values for the first image clips without inputting an image clip subsequent to the first image clips to the 3D CNN; and when the score margin is smaller than the threshold value, inputting another image clip subsequent to the first image clips to the 3D CNN.

The operation of determining whether to input at least one additional image clip may include: determining whether to input a next image clip subsequent to the first image clips to a same network as the 3D CNN.

The operation of determining whether to input the next image clip subsequent to the first image clips to the same network as the 3D CNN may include: when the score margin is greater than the threshold value, inputting the next image clip subsequent to the first image clips to a network that is the same as the 3D CNN or shallower than the 3D CNN; and when the score margin is smaller than the threshold value, inputting the next image clip to a network deeper than the 3D CNN.

The operation of acquiring the softmax function values may include: accumulatively storing the softmax function values in a memory.

The threshold value may be determined according to at least one of a type of a terminal performing an image recognition, a computing capability of the terminal, a type of the input image, a resolution of the input image, and a number of frames constituting the input image.

Each of the image clips constituting the input image may include a predetermined number of temporally consecutive frames among a plurality of frames constituting the input image.

According to an aspect of another exemplary embodiment, provided is a high-speed image recognition apparatus using a 3D CNN.

The high-speed image recognition apparatus includes: at least one processor; and a memory storing instructions executable by the at least one processor and, when executed by the at least one processor, causing the at least one processor to perform at least one operation.

The at least one operation includes: inputting each of a first image clips among image clips constituting an input image to the 3D CNN; acquiring softmax function values calculated in the 3D CNN with respect to each of the first image clips; calculating a score margin by using the softmax function values; comparing the score margin with a predetermined first threshold value to determine whether to input remaining image clips other than the first image clips among the image clips constituting the input image to the 3D CNN; and comparing the score margin with a predetermined second threshold value to determine whether to input a next image clip subsequent to the first image clips to a same network as the 3D CNN.

According to the high-speed image recognition method and apparatus using a 3D CNN of the present disclosure, it is possible to improve the operation speed and lower the system resource requirement by omitting some of the operations for subsequent image clips depending on the score margin.

Also the present disclosure enables various devices with limited resources to perform the image recognition using the 3D CNN.

BRIEF DESCRIPTION OF THE DRAWINGS

In order that the disclosure may be well understood, there will now be described various forms thereof, given by way of example, reference being made to the accompanying drawings, in which.

Figure 1:
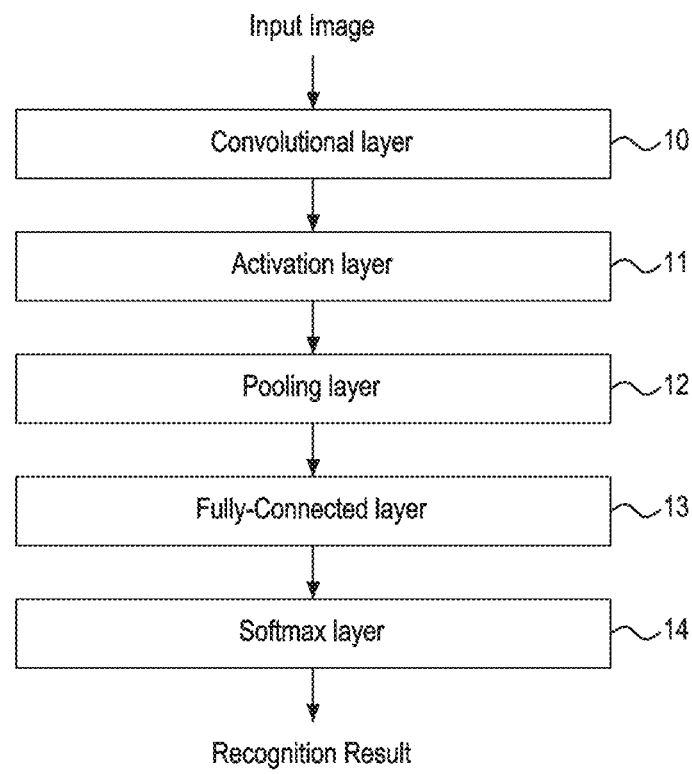
FIG. 1 illustrates a two-dimensional convolutional neural network (CNN) according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings.

FIG. 1 illustrates a two-dimensional (2D) convolutional neural network (CNN) according to an exemplary embodiment of the present disclosure.

A basic hierarchical structure of the 2D CNN is shown in FIG. 1. Specifically, the 2D CNN may include a convolutional layer 10 configured to receive an input image and perform a convolution operation to output a feature map, an activation layer 11 configured to normalize an output of the convolutional layer 10 by using an activation function, and a pooling layer 12 configured to perform a sampling or pooling for the an output of the activation layer 11 to extract representative features. A connection structure of the convolutional layer 10, the activation layer 11, and the pooling layer 12 may be repeatedly configured in several sets. Also, the convolutional neural network may be connected, at a rear end of the connection structure, to a fully-connected layer 13 configured to combine several features extracted by the pooling layer 12, and the fully-connected layer 13 may be connected to a softmax layer 14 configured to normalize an output of the fully-connected layer 13 by using a softmax function.

The convolutional layer 10 may perform the convolution operation on an input image and a filter. The filter may be defined as a pixel region having a value for each component value for performing the convolution operation with a corresponding pixel in the input image. A size of the pixel region may be referred to as a size of the filter, and the filter may be represented by a matrix. The convolutional layer 10 may repeatedly perform the convolution operation with respect to the filter and the input image while sliding the filter in the horizontal and vertical directions of the input image. The interval by which the filter moves at one step may be referred to as a stride. For example, in case that the stride has a value of two, the convolution operation may be performed whenever the filter is moved by two pixels horizontally or vertically over the input image. Meanwhile, since the size of the output image or a feature map may decrease in the convolutional layer 10, the convolutional layer 10 may additionally perform a padding process to adjust the size of the output feature map. The padding process may be a process of filling a specific value (e.g., zero) in an outer area of the input image.

The activation function in the activation layer 11 is a function that converts a feature extracted as a certain value or matrix into a nonlinear value. A sigmoid function, a rectified linear unit (ReLU) function, or the like may be used for the activation function. Although the activation layer 11 is shown separately from the convolutional layer 10 in FIG. 1 for convenience of description, the activation layer 11 may be included in the convolutional layer 10.

The pooling layer 12 may perform a pooling or subsampling on the extracted feature map to select a feature representing the feature map. For example, the pooling layer 12 may perform a max pooling that selects pixels having the largest pixel values in a certain area of the feature map or an average pooling that averages the pixel values to smooth out the image. The pooling layer 12 is not necessarily performed after the activation layer 11 but may be performed optionally.

The fully-connected layer 13, which may be located at the end of the CNN generally, may combine features extracted through the convolutional layer 10, the activation layer 11, and the pooling layer 12 to determine a class to which the input image corresponds.

Specifically, the fully-connected layer 13 may vectorize all the pixels of the feature map, multiply respective parameter values, and combine calculation results to output a class having a largest calculation result value. The softmax layer 14 may represent an operation result value of the fully-connected layer 13 as a probability value lying in a range between 0 and 1 using a softmax function. The softmax function may normalize an input value to a value between 0 and 1, and a sum of the output values for each of the elements is always 1. Although the softmax layer 14 is shown separately from the fully-connected layer 13 in FIG. 1 for convenience of description, the softmax layer 14 may be included in the fully-connected layer 13.

Figure 2:
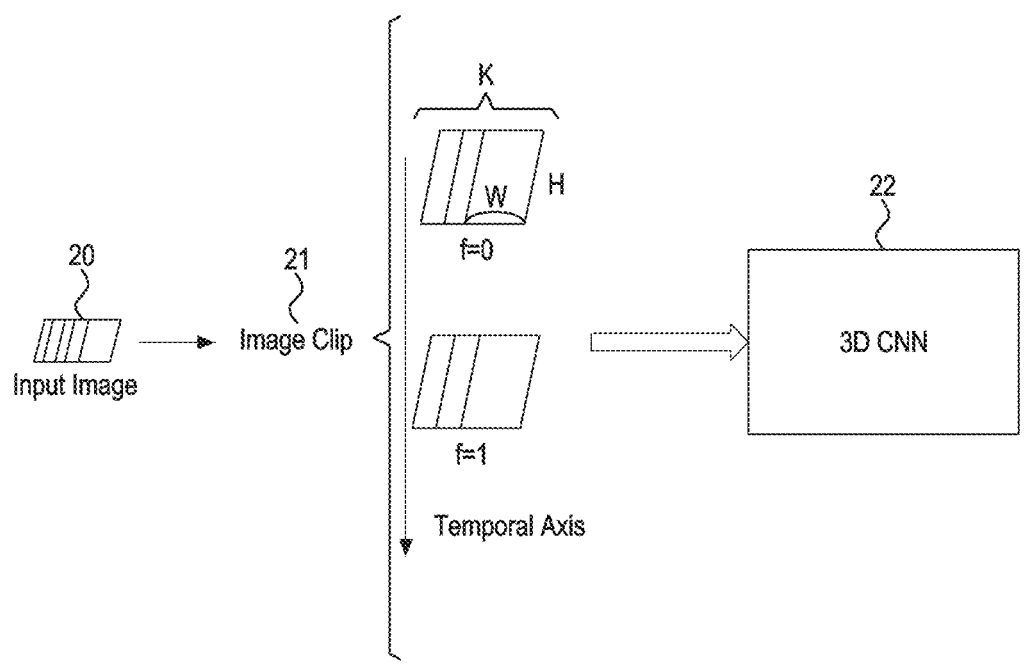
FIG. 2 illustrates a concept of a three-dimensional (3D) CNN according to an exemplary embodiment of the present disclosure.

FIG. 2 illustrates a concept of the 3D CNN according to an exemplary embodiment of the present disclosure.

The 3D CNN can be understood as an artificial neural network in which the 2D CNN shown in FIG. 1 is expanded by one dimension along a time axis. The 2D CNN convolutional neural network shown in FIG. 1 can be used generally in an application which receives the input image and classify the input image according to spatial characteristics of the input image or identify an object in the input image.

However, the 2D CNN has a limitation that it cannot process moving picture data which changes with time. Contrarily, the 3D CNN performs the convolution operation and the pooling operation taking the temporal change of the moving picture data into account, and thus can extract the features of the image taking temporal characteristics of the moving picture data into account.

Specifically, referring to FIG. 2, the input image 20 which is a moving picture comprised of a plurality of frames or pictures sequentially received with time may be classified into a plurality of image clips 21, and each image clip 21 may be applied to the 3D CNN 22 as an input. The image clip 21 may be comprised of a predetermined number of frames. The number of frames in the image clip 21 may be determined correspondingly to a number of frames that the 3D CNN can process at a time. For example, the image clip 21 may be comprised of consecutive frames along the temporal axis. Also, each frame designated with an index f=0 or f=1 in the example of FIG. 2 may include K channels, and each channel may be comprised of images having a resolution of W•H. For example, in case that the image of each frame is represented by RGB components, there may exist three channels each of which is arranged for each of the red (R), green (G), and blue (B) components.

The structure of the 3D CNN 22 is basically the same as or similar to the 2D CNN shown in FIG. 1, but may differ in that all the image data disposed along the temporal axis are used. For example, the convolutional layer of 3D CNN 22, which performs the convolution operations while the filter moves over the image as if the filter scans the image similarly to the 2D convolution, the convolutional layer may perform the convolution operations while moving the filter by the amount of the stride value along the temporal axis also. Also, the pooling layer of the 3D CNN 22 may be an extension of the pooling layer 12 of the 2D CNN shown in FIG. 1 in a direction of the temporal axis and may use all the pixel values along the temporal axis. The fully-connected layer of the 3D CNN 22 vectorizes all the pixels present in the last feature map to obtain a weighted sum with the parameters similarly to the fully-connected layer 13 shown in FIG. 1. The softmax layer of the 3D CNN 22 can operate similarly to the softmax layer 14 shown in FIG. 1.

Since the 3D CNN 22 performs the learning taking the temporal change of the data into account, the 3D CNN 22 may be advantageous in learning a motion of a person that changes with time. However, the consideration of the temporal change of the image data requires more parameters and much more computational amount than the 2D CNN.

Therefore, the present disclosure provides a method of reducing the amount of the computations in the 3D CNN and performing an image recognition at a high speed.

In a general 3D CNN, the softmax function values are calculated for all image clips constituting the input image as shown in FIG. 2, and the image recognition is performed using the calculated softmax values. However, when the softmax values are calculated for all the image clips, the calculation speed is lowered because of the large amount of calculations. In particular, since it is difficult to handle an excessive amount of calculations in a small-sized terminal having only limited computing resources, there is a need for a method capable of reducing the amount of computations and recognizing the images at a high speed in such a small-sized terminal.

In an embodiment of the present disclosure, a concept of a score margin may be defined to solve the problem. The score margin may be defined by Equation 1.

$$\text{score margin} = V_{softmax1} - V_{softmax2} \qquad \text{[Equation 1]}$$

Referring to the Equation 1, the score margin is a difference between a largest softmax function value, $V_{softmax1}$, and a second largest value, $V_{softmax2}$, among the softmax function values calculated for the image clips through the 3D CNN until a timing when the score margin is calculated. Since the softmax function value has a value between 0 and 1, the score margin may also have a value in the range between 0 and 1.

Figure 3A:
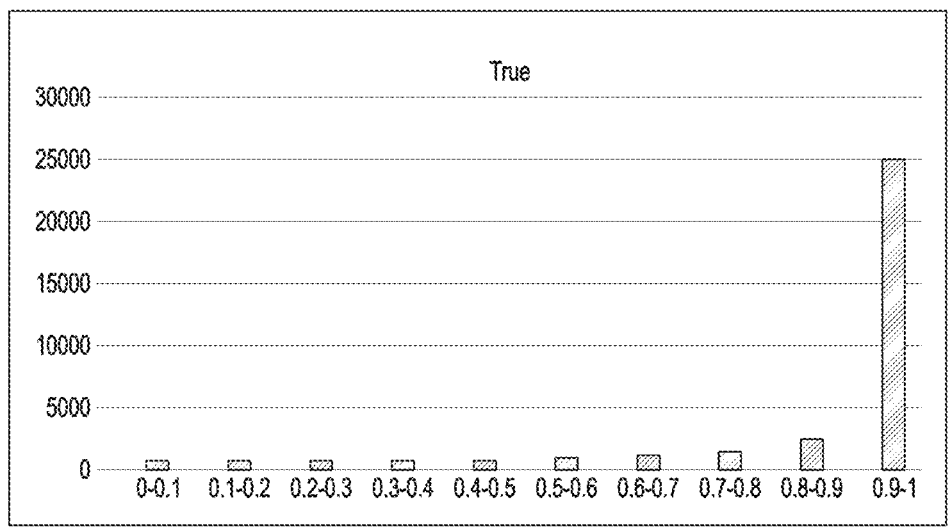
FIG. 3A is a histogram for explaining a score margin value according to an embodiment of the present disclosure.
Figure 3B:
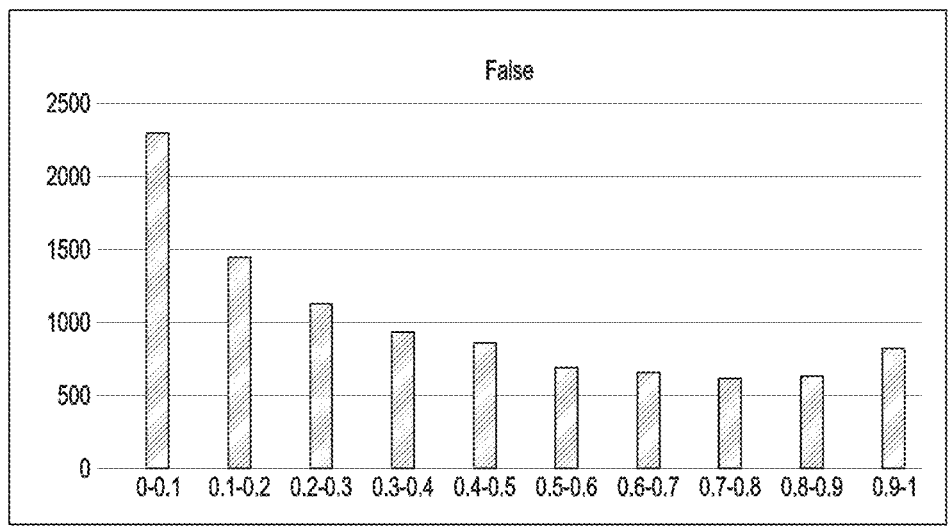
FIG. 3B is a histogram for explaining the score margin value according to another embodiment of the present disclosure.

In order to determine an impact of the score margin calculated by the Equation 1 on a success or failure of the image recognition, the score margin was calculated for a UCF101 data set and a graph for the calculation result is shown in FIGS. 3A and 3B.

FIG. 3A is a histogram for explaining a score margin value according to an embodiment of the present disclosure.

In detail, FIG. 3A shows a distribution of the score margin values of the image data when the image recognition is successful. In the drawing, the vertical axis represents a frequency of the image data and the horizontal axis represents the score margin values. It can be seen that lots of data is concentrated in an interval where the score margin value is between 0.9 and 1.

FIG. 3B is a histogram for explaining the score margin value according to another embodiment of the present disclosure.

In detail, FIG. 3B shows a distribution of the score margin values of the image data when the image recognition fails. In the drawing, the vertical axis represents a frequency of the image data and the horizontal axis represents the score margin values. It can be seen that much more data is distributed in the intervals where the score margin values are small than the intervals of the higher score margin values.

Accordingly, it can be said from FIGS. 3A and 3B that, if the score margin value is sufficiently large, the image recognition for the input image may be successful only with the image clips analyzed so far through the current 3D CNN and the image recognition on subsequent image clips may be unnecessary. Hereinbelow, described is a method of evaluating the score margin values calculated by inputting the image clips into the 3D CNN so far and, when it is determined from the score margin values that the image recognition is successful, omitting an input to the 3D CNN of subsequent image clips or analyzing the subsequent image clips using another 3D CNN with a low computational complexity.

Figure 4:
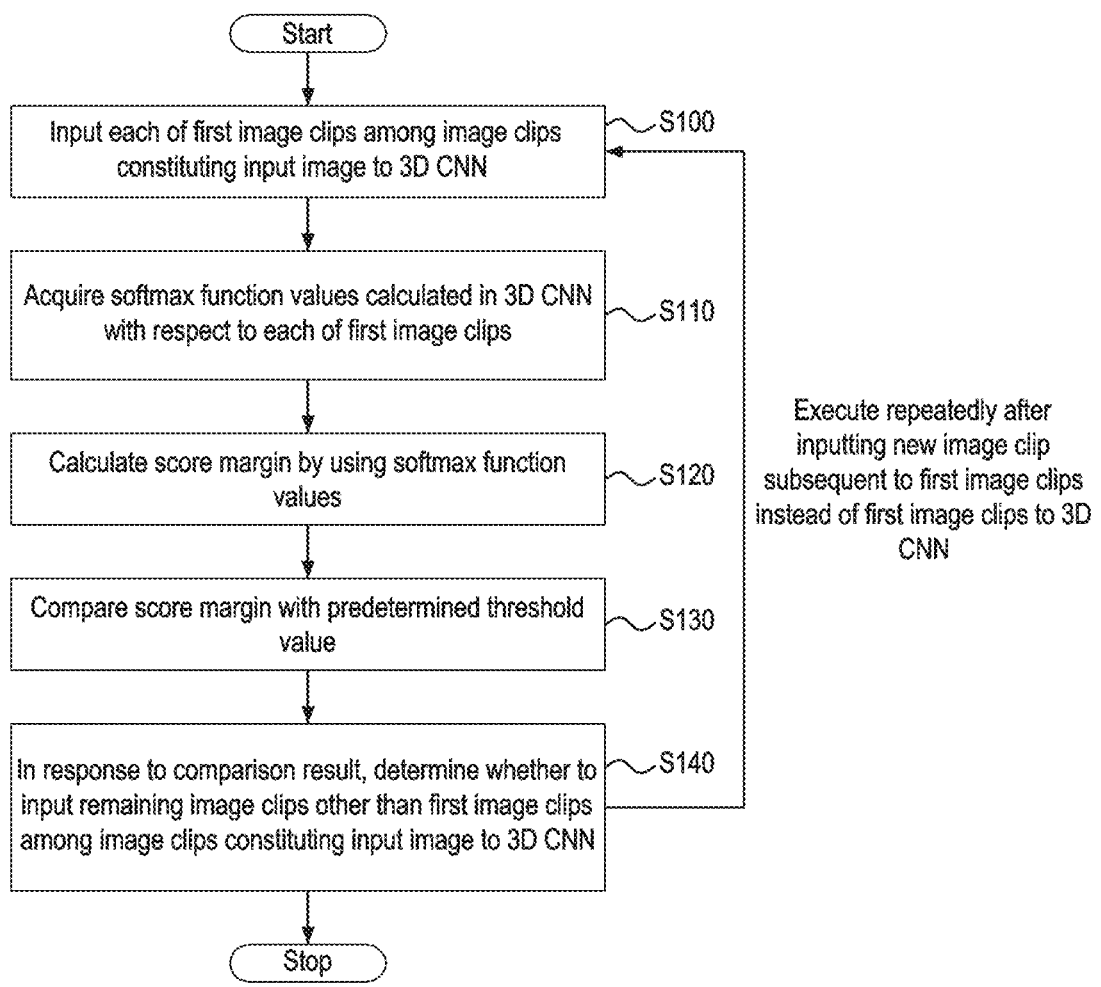
FIG. 4 is a flowchart showing a high-speed image recognition method using the 3D CNN according to a first embodiment of the present disclosure.

FIG. 4 is a flowchart showing a high-speed image recognition method using the 3D CNN according to a first embodiment of the present disclosure.

Referring to FIG. 4, the high-speed image recognition method using the 3D CNN according to the first embodiment may include operations of: inputting each of a first image clips among the image clips constituting the input image to the 3D CNN (S100), acquiring softmax function values calculated in the 3D CNN with respect to each of the first image clips (S110); calculating a score margin by using the softmax function values (S120); comparing the score margin with a predetermined threshold value (S130); and in response to a comparison result, determining whether to input remaining image clips other than the first image clips among the image clips constituting the input image to the 3D CNN (S140).

Here, the first image clips may refer to a plurality of image clips from a first image clip that is to be input to the 3D CNN, but may be a single image clip, i.e. the first image clip.

The score margin may be a difference between the largest softmax function value and the second largest softmax function value among the softmax function values. For example, the score margin may be defined according to the Equation 1.

The operation S140 of determining whether to input the remaining image clips to the 3D CNN may include performing the image recognition for the input image only with the softmax function values for the image clips analyzed so far without inputting the image clip subsequent to the first image clips to the 3D CNN when the score margin is greater than the threshold value. Thus, an image recognition result may be acquired by analyzing the 3D CNN only for the first image clips while omitting the analysis on the image clips subsequent to the first image clips.

The operation S140 of determining whether to input the remaining image clips to the 3D CNN may include inputting another image clip subsequent to the first image clips to the 3D CNN when the score margin is smaller than the threshold value.

Therefore, whenever a new image clip is input after the first image clips, the score margin may be repeatedly calculated and compared with the threshold value, and it is determined whether to input a next image clip or complete the image recognition and finalize the image recognition result at a current stage.

The operation S110 of acquiring the softmax function values may further include accumulatively storing the softmax function values in a memory. Since the softmax function values are accumulatively stored, the score margin may be calculated according to the operation S120 based on the softmax function value calculated for the next image clip newly input to the 3D CNN in addition to the softmax function values calculated already with respect to the first image clips.

The threshold value may be determined according to at least one of a type of a terminal performing the image recognition, a computing capability of the terminal, a type of the input image, a resolution of the input image, and a number of frames constituting the input image.

Each of the image clips constituting the input image may be comprised of a predetermined number of temporally consecutive frames among a plurality of frames constituting the input image.

Figure 5:
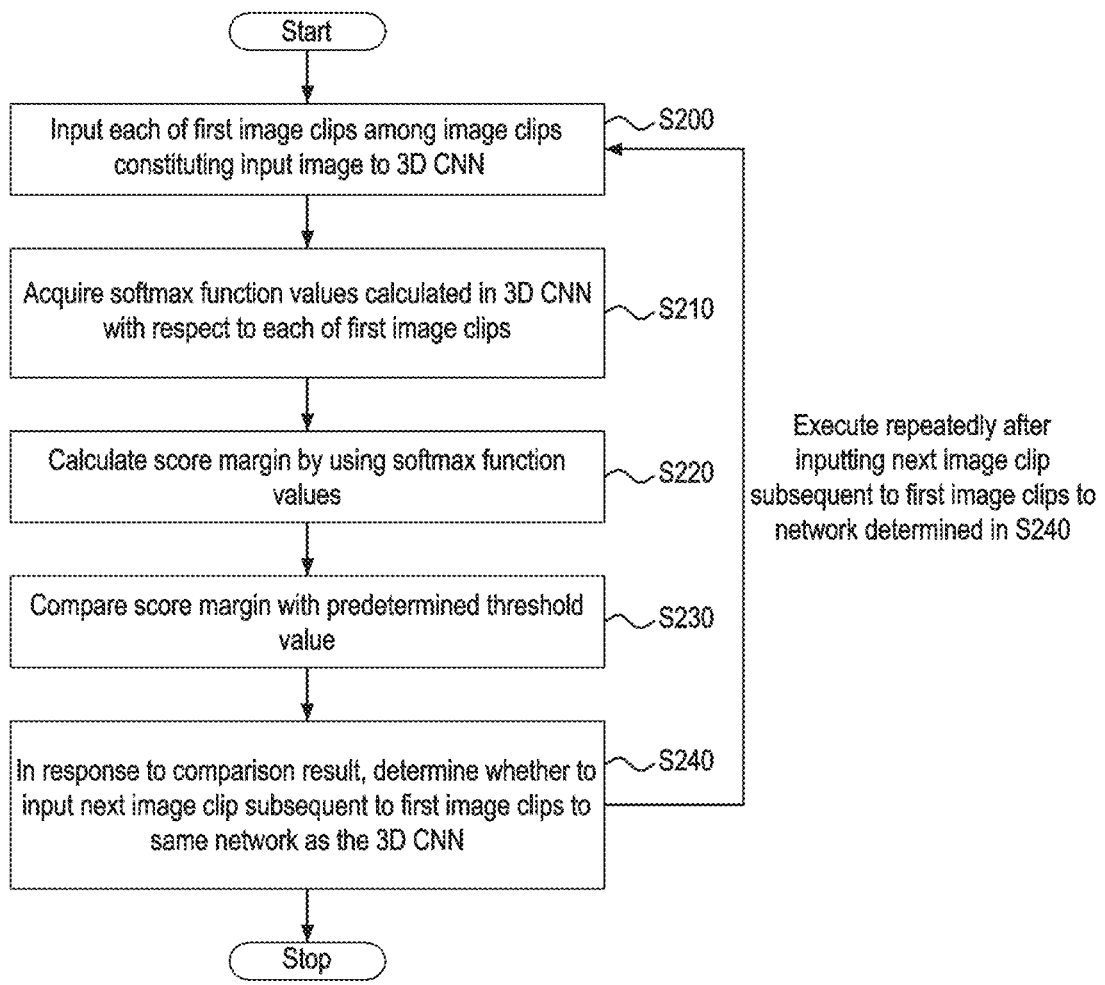
FIG. 5 is a flowchart showing a high-speed image recognition method using the 3D CNN according to a second embodiment of the present disclosure.

FIG. 5 is a flowchart showing a high-speed image recognition method using the 3D CNN according to a second embodiment of the present disclosure.

Referring to FIG. 5, the high-speed image recognition method using the 3D CNN according to the second embodiment may include operations of: inputting each of the first image clips among the image clips constituting the input image to the 3D CNN (S200), acquiring the softmax function values calculated in the 3D CNN with respect to each of the first image clips (S210); calculating the score margin by using the softmax function values (S220); comparing the score margin with a predetermined threshold value (S230); and in response to a comparison result, determining whether to input the next image clip subsequent to the first image clips among the image clips constituting the input image to a same network as the 3D CNN (S240).

Here, the first image clips may refer to a plurality of image clips from a first image clip that is to be input to the 3D CNN, but may be a single image clip, i.e. the first image clip.

The score margin may be the difference between the largest softmax function value and the second largest softmax function value among the softmax function values. For example, the score margin may be defined according to the Equation 1.

The operation S240 of determining whether to input the next image clip to the same network as the 3D CNN may include inputting the next image clip subsequent to the first image clips to a network that is the same as the 3D CNN or shallower than the 3D CNN when the score margin is greater than the threshold value. When the score margin is greater than the threshold value, it is highly likely that the image recognition result inferred from the currently input image clips is correct. Thus, the next image clip may be input to the network that is the same as or shallower than the 3D CNN used for the current inference to enhance the computation speed in such a case. In this disclosure, the term 'shallow' network may refer to a network having a small number of convolutional layers or having a low computational complexity.

The operation S240 of determining whether to input the next image clip to the same network as the 3D CNN may include inputting the next image clip to a network deeper than the 3D CNN when the score margin is smaller than the threshold value. When the score margin is smaller than the threshold value, it is highly likely that the image recognition result inferred from the currently input image clips is wrong. Thus, the next image clip may be input to the network that is deeper than the 3D CNN used for the current inference to enhance the computation speed. In this disclosure, the term 'deep' network may refer to a network having a large number of convolutional layers or having a high computational complexity.

The operation S210 of acquiring the softmax function values may further include accumulatively storing the softmax function values in a memory. Since the softmax function values are accumulatively stored, the score margin may be calculated according to the operation S220 based on the softmax function value calculated for the next image clip newly input to the 3D CNN in addition to the softmax function values calculated already with respect to the first image clips.

The threshold value may be determined according to at least one of the type of the terminal performing the image recognition, the computing capability of the terminal, the type of the input image, the resolution of the input image, and the number of frames constituting the input image.

Each of the image clips constituting the input image may be comprised of a predetermined number of temporally consecutive frames among the plurality of frames constituting the input image.

If the network to which the next image clip is to be input is determined in the operation S240, the next image clip following the first image clips is input to the network determined in the operation S240, and the procedure from the operation S210 to the operation S240 is executed repeatedly. The network to calculate the softmax function values and the score margin may be determined dynamically for all of the image clips in such a manner.

In case that the next image clip is a last image clip of the input image in the operation S240, the last image clip is input to the network determined in the operation S240, the softmax function value is calculated, a final image recognition result is generated based on the softmax function values, and then the image recognition process is terminated.

Meanwhile, the first embodiment and the second embodiment shown in FIGS. 4 and 5, respectively, may be combined with each other to be implemented as a third embodiment.

In more detail, according to the first and second embodiments, subsequent operations may be omitted or the network to be applied may be changed based on the score margin defined in the present disclosure. In the third embodiment, the score margin calculated in the operations S100-S120 according to the first embodiment may be compared with a first threshold value to perform the operation S140 according to the first embodiment depending on the comparison result, and the score margin calculated in the operations S100-S120 may be compared with a second threshold value to perform the operation S240 according to the second embodiment depending on the comparison result. The first threshold value and the second threshold value may be set to be different from each other, but may be set to be the same as each other. The third embodiment will now be described in more detail with reference to FIG. 6.

Figure 6:
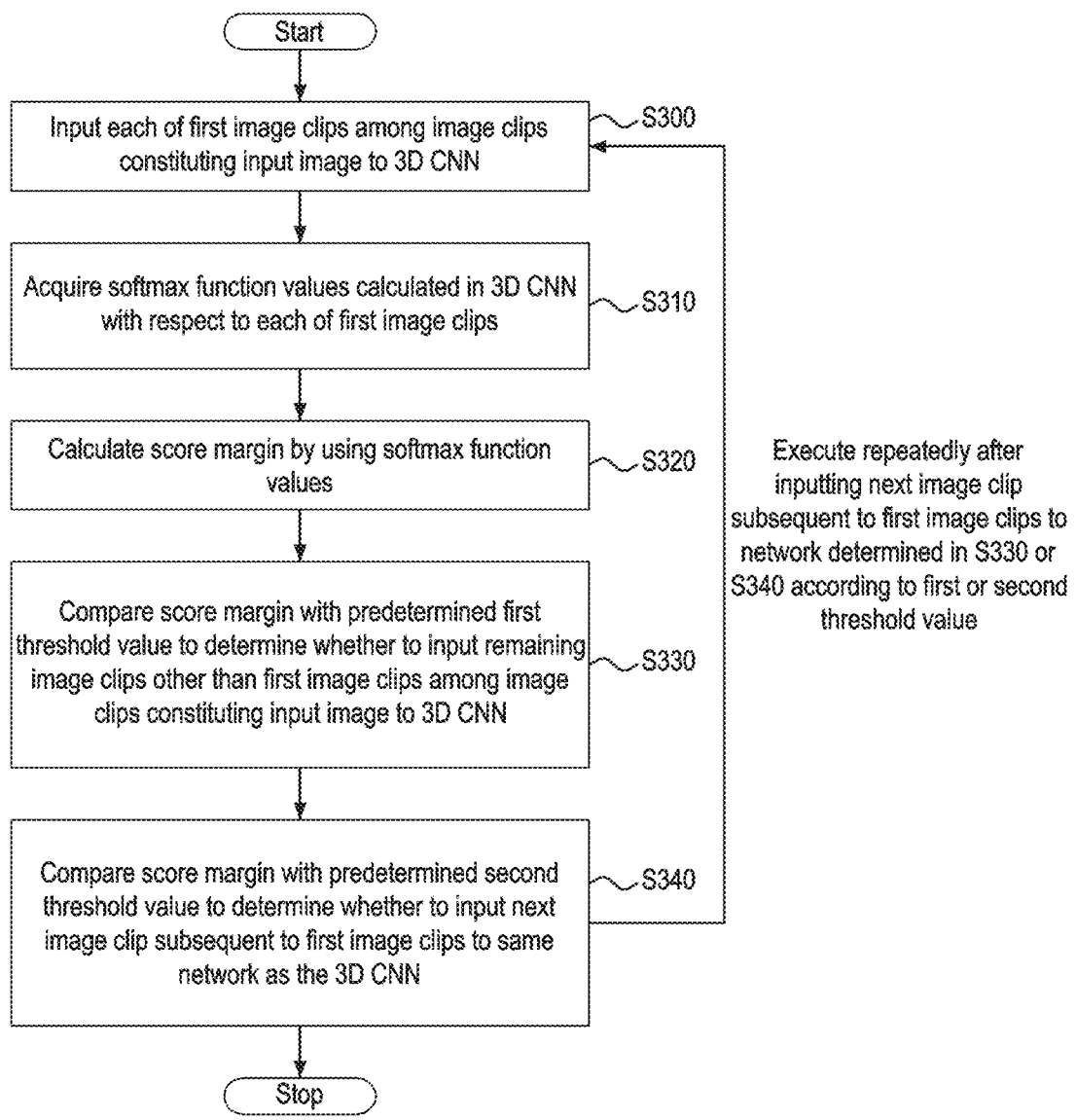
FIG. 6 is a flowchart showing a high-speed image recognition method using the 3D CNN according to a third embodiment of the present disclosure.

FIG. 6 is a flowchart showing a high-speed image recognition method using the 3D CNN according to a third embodiment of the present disclosure.

Referring to FIG. 6, the high-speed image recognition method using the 3D CNN according to the third embodiment may include operations of: inputting each of the first image clips among the image clips constituting the input image to the 3D CNN (S300), acquiring the softmax function values calculated in the 3D CNN with respect to each of the first image clips (S310); calculating the score margin by using the softmax function values (S320); comparing the score margin with a predetermined first threshold value to determine whether to input remaining image clips other than the first image clips among the image clips constituting the input image to the 3D CNN (S330); and comparing the score margin with a predetermined second threshold value to determine whether to input the next image clip subsequent to the first image clips among the image clips constituting the input image to the same network as the 3D CNN (S340).

Here, the first image clips may refer to a plurality of image clips from a first image clip that is to be input to the 3D CNN, but may be a single image clip, i.e. the first image clip.

The score margin may be the difference between the largest softmax function value and the second largest softmax function value among the softmax function values. For example, the score margin may be defined according to the Equation 1.

The operation S330 of determining whether to input the remaining image clips to the 3D CNN may include performing the image recognition for the input image only with the softmax function values for the image clips analyzed so far without inputting the image clip subsequent to the first image clips to the 3D CNN when the score margin is greater than the first threshold value. Thus, an image recognition result may be acquired by analyzing the 3D CNN only for the first image clips while omitting the analysis on the image clips subsequent to the first image clips.

The operation S330 of determining whether to input the remaining image clips to the 3D CNN may include inputting another image clip subsequent to the first image clips to the 3D CNN when the score margin is smaller than the first threshold value. Therefore, whenever a new image clip is input after the first image clips, the score margin may be repeatedly calculated and compared with the first threshold value, and it is determined whether to input a next image clip or complete the image recognition and finalize the image recognition result at a current stage.

The operation S340 of determining whether to input the next image clip to the same network as the 3D CNN may include inputting the next image clip subsequent to the first image clips to a network that is the same as the 3D CNN or shallower than the 3D CNN when the score margin is greater than the second threshold value. As described above with reference to FIG. 5, when the score margin is greater than the second threshold value, it is highly likely that the image recognition result inferred from the currently input image clips is correct. Thus, the next image clip may be input to the network that is the same as or shallower than the 3D CNN used for the current inference to enhance the computation speed in such a case. In this disclosure, the term 'shallow' network may refer to a network having a small number of convolutional layers or having a low computational complexity.

The operation S340 of determining whether to input the next image clip to the same network as the 3D CNN may include inputting the next image clip to a network deeper than the 3D CNN when the score margin is smaller than the second threshold value. As described above with reference to FIG. 5, when the score margin is smaller than the second threshold value, it is highly likely that the image recognition result inferred from the currently input image clips is wrong. Thus, the next image clip may be input to the network that is deeper than the 3D CNN used for the current inference to enhance the computation speed. In this disclosure, the term 'deep' network may refer to a network having a large number of convolutional layers or having a high computational complexity.

The operation S310 of acquiring the softmax function values may further include accumulatively storing the softmax function values in a memory. Since the softmax function values are accumulatively stored, the score margin may be calculated according to the operation S320 based on the softmax function value calculated for the next image clip newly input to the 3D CNN in addition to the softmax function values calculated already with respect to the first image clips.

The threshold value may be determined according to at least one of the type of the terminal performing the image recognition, the computing capability of the terminal, the type of the input image, the resolution of the input image, and the number of frames constituting the input image.

Each of the image clips constituting the input image may be comprised of a predetermined number of temporally consecutive frames among the plurality of frames constituting the input image.

Figure 7:
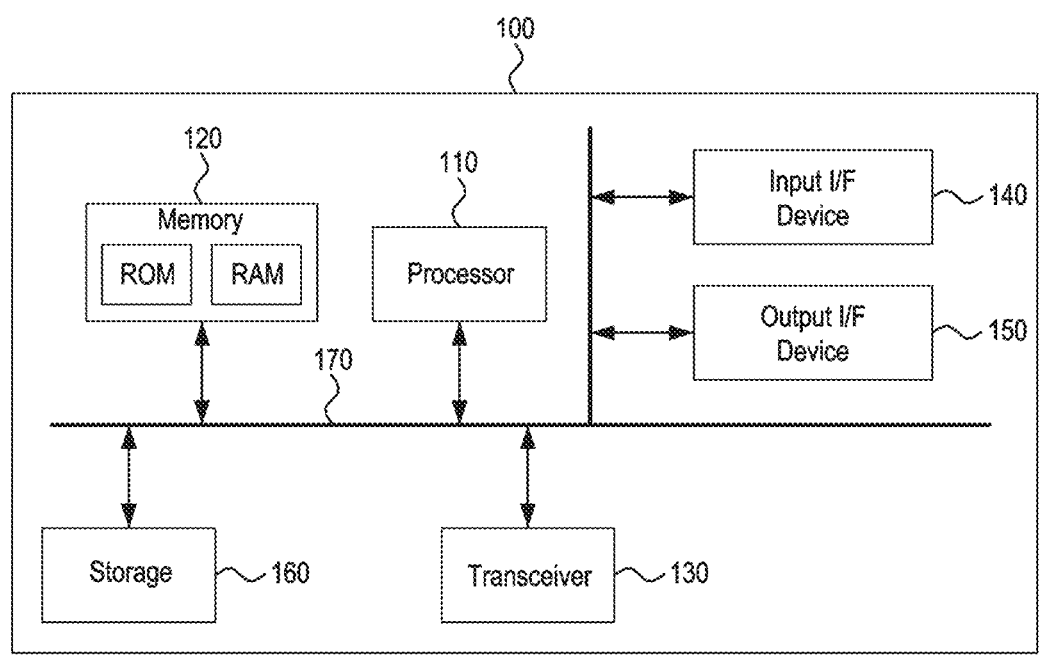
FIG. 7 is a block diagram of a high-speed image recognition apparatus using the 3D CNN according to a first through a third embodiments of the present disclosure.

FIG. 7 is a block diagram of a high-speed image recognition apparatus using the 3D CNN according to a first through a third embodiments of the present disclosure.

Referring to FIG. 7, the high-speed image recognition apparatus 100 using the 3D CNN according to the first to third embodiments of the present disclosure includes at least one processor 110 and a memory 120 storing instructions to cause the at least one processor 110 to perform at least one operation.

The at least one processor 110 may include a central processing unit (CPU) or a graphics processing unit (GPU), or may be implemented by another kind of dedicated processor suitable for performing the methods according to the embodiments of the present disclosure.

For example, the at least one operation performed by the processor 110 of the high-speed image recognition apparatus using the 3D CNN according to a first and second embodiments of the present disclosure may include operations of: inputting each of a first image clips among the image clips constituting the input image to the 3D CNN, acquiring softmax function values calculated in the 3D CNN with respect to each of the first image clips; calculating a score margin by using the softmax function values; comparing the score margin with a predetermined threshold value to determine whether to input at least one additional image clip other than the first image clips among the image clips constituting the input image to the 3D CNN.

The score margin may be the difference between the largest softmax function value and the second largest softmax function value among the softmax function values.

According to the first embodiment, the operation of determining whether to input at least one additional image clip may include determining whether to input remaining image clips other than the first image clips to the 3D CNN.

In the operation of determining whether to input the remaining image clips to the 3D CNN, when the score margin is greater than the threshold value, the processor 110 may perform the image recognition for the input image only with the softmax function values for the first image clips without inputting the image clip subsequent to the first image clips to the 3D CNN.

Meanwhile, when the score margin is smaller than the threshold value, the processor 110 may input another image clip subsequent to the first image clips to the 3D CNN.

According to the second embodiment, the operation of determining whether to input at least one additional image clip may include determining whether to input the next image clip subsequent to the first image clips to the same network as the 3D CNN.

The operation of determining whether to input the next image clip to the same network as the 3D CNN may include, when the score margin is greater than the threshold value, inputting the next image clip subsequent to the first image clips to a network that is the same as the 3D CNN or shallower than the 3D CNN.

The operation of determining whether to input the next image clip to the same network as the 3D CNN may include, when the score margin is smaller than the threshold value, inputting the next image clip to a network deeper than the 3D CNN.

In the operation of acquiring the softmax function values, the processor 110 of the high-speed image recognition apparatus using the 3D CNN according to the first and second embodiments of the present disclosure may accumulatively store the softmax function values in the memory.

The threshold value may be determined according to at least one of the type of the terminal performing the image recognition, the computing capability of the terminal, the type of the input image, the resolution of the input image, and the number of frames constituting the input image.

Each of the image clips constituting the input image may be comprised of a predetermined number of temporally consecutive frames among the plurality of frames constituting the input image.

For example, the at least one operation performed by the processor 110 of the high-speed image recognition apparatus using the 3D CNN according to a third embodiment of the present disclosure may include operations of: inputting each of a first image clips among the image clips constituting the input image to the 3D CNN, acquiring softmax function values calculated in the 3D CNN with respect to each of the first image clips; calculating a score margin by using the softmax function values; comparing the score margin with a predetermined first threshold value to determine whether to input remaining image clips other than the first image clips among the image clips constituting the input image to the 3D CNN; and comparing the score margin with a predetermined second threshold value to determine whether to input the next image clip subsequent to the first image clips to the same network as the 3D CNN.

The score margin may be the difference between the largest softmax function value and the second largest softmax function value among the softmax function values.

In the operation of comparing the score margin with the predetermined first threshold value to determine whether to input remaining image clips other than the first image clips among the image clips constituting the input image to the 3D CNN, when the score margin is greater than the first threshold value, the image recognition for the input image may be performed only with the softmax function values for the first image clips without inputting the image clip subsequent to the first image clips to the 3D CNN.

On the other hand, when the score margin is smaller than the first threshold value, the image clip subsequent to the first image clips may be inputted to the 3D CNN.

The operation of comparing the score margin with the predetermined second threshold value to determine whether to input the next image clip subsequent to the first image clips to the same network as the 3D CNN may include an operation of determining whether to input the next image clip subsequent to the first image clips to the same network as the 3D CNN.

In the operation of determining whether to input the next image clip subsequent to the first image clips to the same network as the 3D CNN, when the score margin is greater than the second threshold value, the processor 110 may input the next image clip subsequent to the first image clips to a network that is the same as the 3D CNN or shallower than the 3D CNN.

On the other hand, when the score margin is smaller than the second threshold value, the processor 110 may input the next image clip to a network deeper than the 3D CNN.

Each of the memory 120 and the storage 160 may be implemented by at least one of a volatile storage medium and a nonvolatile storage medium. For example, the memory 120 may include at least one of a read only memory (ROM) and a random access memory (RAM).

In addition, the high-speed image recognition apparatus 100 using the 3D CNN may include a transceiver 130 for performing communications through a wireless network. Also, the apparatus may further include an input interface device 140, an output interface device 150, and a storage 160. The components of the high-speed image recognition apparatus 100 using the 3D CNN may be connected by a bus 170 to communicate with each other.

The high-speed image recognition apparatus using the 3D CNN 100 may be provided in a form of various devices having communications capability such as a desktop computer, a laptop computer, a notebook computer, a smartphone, and a tablet PC, a mobile phone, a smart watch, smart glasses, an e-book reader, a portable multimedia player (PMP), a portable game console, a navigation device, a digital camera, a digital multimedia broadcasting (DMB) player, a digital audio recorder, a digital audio player, a digital video recorder, a digital video player, a personal digital assistant (PDA), for example.

The methods according to the present disclosure may be implemented in a form of program instructions that can be executed through various computing devices and may be recorded in a computer-readable medium. The computer-readable medium may store the program instructions, data files, data structures, or a combination thereof. The program instructions recorded in the computer-readable medium may be specially designed and configured for the present disclosure, or may be based on a program known to and usable to those skilled in computer software.

Examples of computer-readable media may include hardware devices especially configured to store and execute the program instructions such as the ROM, the RAM, the flash memory and the like. Examples of the program instructions may include machine language codes such as those generated by a compiler as well as high-level language codes that can be executed by a computer using an interpreter. The hardware device described above may be configured in a form of at least one software module performing the operation according to the present disclosure, and vice versa.

In addition, the methods or apparatuses described above may be implemented by combining all or part of the configuration or function of each embodiment, or may be implemented alone.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. A high-speed image recognition method using a three-dimensional convolutional neural network (3D CNN), comprising:
    inputting each of two or more first image clips among image clips constituting an input image to the 3D CNN;
    acquiring softmax function values calculated in the 3D CNN with respect to each of the two or more first image clips;
    calculating a score margin indicating a possibility of successful recognition by using the softmax function values;
    comparing the score margin with a predetermined threshold value to generate a comparison result;
    based on the comparison result, determining whether to input at least one additional image clip other than the two or more first image clips among the image clips constituting the input image to the 3D CNN; and
    performing image recognition on the input image using at least the two or more first image clips, including determining whether to use the at least one additional image clip based on the comparison result.

2. The high-speed image recognition method of claim 1, wherein the score margin is a difference between a largest softmax function value and a second largest softmax function value among the softmax function values.

3. The high-speed image recognition method of claim 1, wherein performing the image recognition on the input image comprises:
    when the score margin is greater than the threshold value, performing the image recognition for the input image with the softmax function values for the two or more first image clips without inputting the at least one additional image clip subsequent to the two or more first image clips to the 3D CNN; and
    when the score margin is smaller than the threshold value, inputting the at least one additional image clip to the 3D CNN and performing the image recognition for the input image with the two or more first image clips and the at least one additional image clip.

4. The high-speed image recognition method of claim 3, wherein performing the image recognition for the input image with the two or more first image clips and the at least one additional image clip comprises:
    acquiring new softmax function values for each of the two or more first image clips and the at least one additional image clip;
    calculating a new score margin by using the new softmax function values; and
    comparing the new score margin with the predetermined threshold value to determine whether to input another image clip to the 3D CNN or complete the image recognition and finalize a result of the image recognition.

5. The high-speed image recognition method of claim 1, wherein determining whether to input the at least one additional image clip comprises:
    determining whether to input a next image clip subsequent to the two or more first image clips to a same network as the 3D CNN.

6. The high-speed image recognition method of claim 3, wherein performing the image recognition on the input image further comprises:
    when the score margin is smaller than the threshold value, comparing the score margin with a second threshold value to determine whether to input the at least one additional image clip to a same network as the 3D CNN.

7. The high-speed image recognition method of claim 1, wherein acquiring the softmax function values comprises:
    accumulatively storing the softmax function values in a memory.

8. The high-speed image recognition method of claim 1, wherein the threshold value is determined according to at least one of a type of a terminal performing an image recognition, a computing capability of the terminal, a type of the input image, a resolution of the input image, and a number of frames constituting the input image.

9. The high-speed image recognition method of claim 1, wherein each of the image clips constituting the input image comprises a predetermined number of temporally consecutive frames among a plurality of frames constituting the input image.

10. A high-speed image recognition apparatus using a three-dimensional convolutional neural network (3D CNN), comprising:
    at least one processor; and
    a memory storing instructions executable by the at least one processor and, when executed by the at least one processor, causing the at least one processor to perform at least one operation,
    wherein the at least one operation comprises:
    inputting each of two or more first image clips among image clips constituting an input image to the 3D CNN;
    acquiring softmax function values calculated in the 3D CNN with respect to each of the first image clips;
    calculating a score margin indicating a possibility of successful recognition by using the softmax function values;
    comparing the score margin with a predetermined threshold value to generate a comparison result;
    based on the comparison result, determining whether to input at least one additional image clip other than the two or more first image clips among the image clips constituting the input image to the 3D CNN; and
    performing image recognition on the input image using at least the two or more first image clips, including determining whether to use the at least one additional image clip based on the comparison result.

11. The high-speed image recognition apparatus of claim 10, wherein the score margin is a difference between a largest softmax function value and a second largest softmax function value among the softmax function values.

12. The high-speed image recognition apparatus of claim 10, wherein the operation of performing the image recognition on the input image comprises:
when the score margin is greater than the threshold value, performing the image recognition for the input image with the softmax function values for the two or more first image clips without inputting the at least one additional image clip subsequent to the two or more first image clips to the 3D CNN; and
when the score margin is smaller than the threshold value, inputting the at least one additional image clip to the 3D CNN and performing the image recognition for the input image with the two or more first image clips and the at least one additional image clip.

13. The high-speed image recognition apparatus of claim 12, wherein the operation of performing the image recognition for the input image with the two or more first image clips and the at least one additional image clip comprises:
acquiring new softmax function values for each of the two or more first image clips and the at least one additional image clip;
calculating a new score margin by using the new softmax function values; and
comparing the new score margin with the predetermined threshold value to determine whether to input another image clip to the 3D CNN or complete the image recognition and finalize a result of the image recognition.

14. The high-speed image recognition apparatus of claim 10, wherein the operation of determining whether to input the at least one additional image clip comprises:
determining whether to input a next image clip subsequent to the two or more first image clips to a same network as the 3D CNN.

15. The high-speed image recognition apparatus of claim 10, wherein the operation of acquiring the softmax function values comprises:
accumulatively storing the softmax function values in a memory.

16. The high-speed image recognition apparatus of claim 10, wherein the threshold value is determined according to at least one of a type of a terminal performing an image recognition, a computing capability of the terminal, a type of the input image, a resolution of the input image, and a number of frames constituting the input image.

17. The high-speed image recognition apparatus of claim 10, wherein each of the image clips constituting the input image comprises a predetermined number of temporally consecutive frames among a plurality of frames constituting the input image.

18. The high-speed image recognition apparatus of claim 10, wherein the operation of performing image recognition on the input image further comprises:
when the score margin is smaller than the threshold value, comparing the score margin with a predetermined second threshold value to determine whether to input the at least one additional image clip to a same network as the 3D CNN.

19. A non-transitory computer-readable storage medium, storing one or more programs for execution by one or more processors of a computer system, the one or more programs including instructions for
inputting each of two or more first image clips among image clips constituting an input image to the 3D CNN;
acquiring softmax function values calculated in the 3D CNN with respect to each of the two or more first image clips;
calculating a score margin indicating a possibility of successful recognition by using the softmax function values;
comparing the score margin with a predetermined threshold value to generate a comparison result;
based on the comparison result, determining whether to input at least one additional image clip other than the two or more first image clips among the image clips constituting the input image to the 3D CNN; and
performing image recognition on the input image using at least the two or more first image clips, including determining whether to use the at least one additional image clip based on the comparison result.

20. The non-transitory computer-readable storage medium of claim 19, wherein the score margin is a difference between a largest softmax function value and a second largest softmax function value among the softmax function values.

* * * * *